(12) United States Patent
Hegde et al.

(10) Patent No.: US 10,935,080 B2
(45) Date of Patent: Mar. 2, 2021

(54) EXTENDED HOUSING SLEEVE WITH STIFFENING RING FEATURE

(71) Applicant: United Technologies Corporation, Farmington, CT (US)

(72) Inventors: Aneil S. Hegde, Mansfield Center, CT (US); Kaleb Von Berg, Middletown, CT (US); Daniel Rosen, Colchester, CT (US); Ramin M. Rafatpanah, Windsor, CT (US); Todd A. Davis, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/353,148

(22) Filed: Mar. 14, 2019

(65) Prior Publication Data
US 2020/0292003 A1 Sep. 17, 2020

(51) Int. Cl.
*F01D 25/16* (2006.01)
*F16C 27/04* (2006.01)
*F16C 41/00* (2006.01)
*F16C 17/02* (2006.01)
*F16C 33/74* (2006.01)
*F16C 43/02* (2006.01)

(52) U.S. Cl.
CPC .......... *F16C 41/00* (2013.01); *F01D 25/164* (2013.01); *F16C 17/02* (2013.01); *F16C 27/045* (2013.01); *F16C 33/74* (2013.01); *F16C 43/02* (2013.01); *F16C 2360/23* (2013.01)

(58) Field of Classification Search
CPC .... F16C 27/045; F16C 17/02; F16C 2360/23; F16C 43/02; F16C 33/74; F16C 41/00; F16F 15/0237; F05D 2240/50; F01D 25/16; F01D 25/162; F01D 25/164
See application file for complete search history.

(56) References Cited

U.S. PATENT DOCUMENTS 3,205,024 A * 9/1965 Morley ................. F01D 25/164
384/582
3,456,992 A 7/1969 Kulina
3,652,139 A 3/1972 Memery
(Continued)

FOREIGN PATENT DOCUMENTS

EP 1429043 A2 6/2004
EP 3067579 A * 9/2016
EP 3401514 A1 11/2018

OTHER PUBLICATIONS

European Search Report dated Aug. 25, 2020 issued for corresponding European Patent Application No. 20163423.5.

*Primary Examiner* — Alan B Waits
(74) *Attorney, Agent, or Firm* — Bachman & LaPointe, P.C.

(57) ABSTRACT

A sleeve for a bearing damper comprising a cylinder shaped body having a forward end opposite an aft end, the body including an interior surface opposite an exterior surface, the body configured insertable between a bearing proximate the interior surface and a housing proximate the exterior surface; a ring portion proximate the forward end, the ring portion having an outer diameter larger than a diameter of the body; and an extension portion configured to provide an active damper surface extending beyond the housing.

12 Claims, 3 Drawing Sheets

(56) References Cited

U.S. PATENT DOCUMENTS

| | | | | |
|---|---|---|---|---|
| 3,897,985 | A * | 8/1975 | Davis | D01H 4/14 384/495 |
| 4,378,197 | A * | 3/1983 | Cattaneo | F01D 25/18 184/6.11 |
| 4,782,919 | A * | 11/1988 | Chalaire | F16F 15/0237 184/6.11 |
| 4,867,655 | A * | 9/1989 | Barbic | F16F 15/0237 417/407 |
| 5,253,985 | A | 10/1993 | Ruetz | |
| 6,157,106 | A * | 12/2000 | Tietz | F16C 32/047 118/730 |
| 6,413,046 | B1 * | 7/2002 | Penn | F01D 21/045 384/202 |
| 6,443,698 | B1 * | 9/2002 | Corattiyil | F01D 25/16 384/581 |
| 6,910,863 | B2 | 6/2005 | Scardicchio et al. | |
| 10,156,159 | B1 * | 12/2018 | Ganiger | F01D 25/164 |
| 10,662,811 | B2 | 5/2020 | Davis et al. | |
| 2002/0076124 | A1 * | 6/2002 | Bos | F01D 25/164 384/99 |
| 2003/0039538 | A1 * | 2/2003 | Allmon | F01D 25/16 415/1 |
| 2003/0189382 | A1 * | 10/2003 | Tornquist | F16C 25/08 310/90 |
| 2004/0115041 | A1 * | 6/2004 | Scardicchio | F01D 25/164 415/110 |
| 2005/0287018 | A1 * | 12/2005 | Mavrosakis | F16C 27/045 417/407 |
| 2006/0045404 | A1 * | 3/2006 | Allmon | F01D 25/164 384/581 |
| 2008/0166076 | A1 * | 7/2008 | Stout | F16C 27/04 384/99 |
| 2008/0267766 | A1 * | 10/2008 | Meacham | F01D 25/164 415/104 |
| 2009/0010762 | A1 | 1/2009 | Caucheteux et al. | |
| 2009/0269185 | A1 * | 10/2009 | Spencer | F01D 25/164 415/119 |
| 2011/0058759 | A1 * | 3/2011 | Herborth | F01D 25/164 384/55 |
| 2011/0188995 | A1 * | 8/2011 | Thomassin | F02C 7/06 415/119 |
| 2013/0294917 | A1 * | 11/2013 | Alam | F01D 25/164 416/174 |
| 2014/0193245 | A1 * | 7/2014 | Morreale | F01D 25/164 415/170.1 |
| 2015/0240867 | A1 * | 8/2015 | Amador | F01D 25/164 384/535 |
| 2016/0333927 | A1 | 11/2016 | Rimpel | |
| 2016/0369652 | A1 * | 12/2016 | Morris | F01D 25/18 |
| 2017/0114831 | A1 * | 4/2017 | Snow | F01D 25/162 |
| 2017/0145855 | A1 * | 5/2017 | Ganiger | F01D 25/162 |
| 2017/0362958 | A1 * | 12/2017 | Von Berg | F01D 25/164 |
| 2018/0119572 | A1 * | 5/2018 | Uneura | F02B 39/00 |
| 2019/0063261 | A1 * | 2/2019 | Varney | F01D 25/164 |

\* cited by examiner

EXTENDED HOUSING SLEEVE WITH STIFFENING RING FEATURE

BACKGROUND

The present disclosure is directed to a bearing sleeve and particularly to a thin cylindrical sleeve that can be press fit into a parent component (in this application, a bearing housing), but extends beyond the mating parent component surface.

The simplest type of bearing is a plain bearing. A plain bearing may be simply a cylindrical bearing surface of a bore with a shaft passing through it, or of a planar surface that bears another. In the absence of lubricant, the opposing bearing surfaces are in contact, and the friction force is influenced by the tribological properties of the materials. With the presence of a fluid lubricant (e.g., oil), relative motion of the bearing surfaces causes the lubricant to shear, which generates hydrodynamic pressure that, with sufficient relative velocity, allows a thin film of the lubricant to support the force between the shaft and bearing (i.e., they are no longer in contact).

Rotating machinery shafts are often subjected to various destabilizing forces (e.g., cross-coupled stiffness forces from bearings, seals, and aerodynamic elements such as axial and centrifugal compressor and turbine stages) which require energy dissipation via damping to prevent rotor-dynamic instability. Dampers are utilized with the bearings in order to stabilize the rotating machinery.

In certain gas turbine engine designs the dimensional requirements for the damper may not match the existing dimensional requirements of the bearing housing such that the housing does not have adequate length to incorporate the damper.

What is needed is to provide a "plug-in" solution for extending the damper surface beyond what the existing housing allows, thereby allowing the use of a re-operated existing housing design rather than a costly and time intensive new housing design.

What is needed is a sleeve that allows for the use of a re-operated existing housing design rather than a costly and time intensive new housing design.

SUMMARY

In accordance with the present disclosure, there is provided a sleeve for a bearing damper comprising a cylinder shaped body having a forward end opposite an aft end, the body including an interior surface opposite an exterior surface, the body configured insertable between a bearing proximate the interior surface and a housing proximate the exterior surface; a ring portion proximate the forward end, the ring portion having an outer diameter larger than a diameter of the body; and an extension portion configured to provide an active damper surface extending beyond the housing.

In another and alternative embodiment, the extension portion provides a sleeve length longer than a housing length.

In another and alternative embodiment, the sleeve for a bearing damper further comprises a seal receiver formed in the interior surface proximate the ring portion at the forward end.

In another and alternative embodiment, the seal receiver is configured as a chamfer.

In another and alternative embodiment, the seal receiver is configured to receive an O-ring.

In another and alternative embodiment, the ring portion comprises a thickened cross-section configured to stiffen the sleeve proximate the extension portion.

In another and alternative embodiment, the sleeve for a bearing damper further comprises a feature formed in the body proximate the aft end.

In accordance with the present disclosure, there is provided a gas turbine bearing assembly comprising a housing proximate a bearing having an oil damper, the bearing supporting a shaft; a sleeve having a cylinder shaped body having a forward end opposite an aft end, the body including an interior surface opposite an exterior surface, the body configured insertable between the bearing proximate the interior surface and the housing proximate the exterior surface; the sleeve including a ring portion proximate the forward end, the ring portion having an outer diameter larger than a diameter of the body; and an extension portion configured to provide an active damper surface extending beyond the housing.

In another and alternative embodiment, the extension portion provides a sleeve length longer than a housing length.

In another and alternative embodiment, the gas turbine bearing assembly further comprises a seal receiver formed in the interior surface proximate the ring portion at the forward end.

In another and alternative embodiment, the seal receiver is configured as a chamfer.

In another and alternative embodiment, the ring portion comprises a thickened cross-section configured to stiffen the sleeve proximate the extension portion.

In another and alternative embodiment, the ring portion includes a geometry that provides added stiffness to the body.

In accordance with the present disclosure, there is provided a process for creating an active damper surface extending beyond a housing comprising inserting a sleeve between the housing and a bearing mounted within the housing; the sleeve having a cylinder shaped body having a forward end opposite an aft end, the body including an interior surface opposite an exterior surface, the body configured insertable between the bearing proximate the interior surface and the housing proximate the exterior surface; the sleeve including a ring portion proximate the forward end, the ring portion having an outer diameter larger than a diameter of the body; and an extension portion configured to provide an active damper surface extending beyond the housing.

In another and alternative embodiment, the extension portion provides a sleeve length longer than a housing length.

In another and alternative embodiment, the process further comprises extending an interface length of a damper coupled to the bearing proximate the housing.

In another and alternative embodiment, the ring portion includes cross section that has a greater thickness than the remainder of the body.

In another and alternative embodiment, the process further comprises a seal receiver formed in the interior surface proximate the ring portion at the forward end.

In another and alternative embodiment, the ring portion includes a geometry that provides added stiffness to the body.

In another and alternative embodiment, the process further comprises a feature formed in the body between the forward end and aft end, the feature comprising at least one of an anti-rotation feature, and a clocking feature.

Other details of the sleeve are set forth in the following detailed description and the accompanying drawings wherein like reference numerals depict like elements.

DETAILED DESCRIPTION

Figure 1:
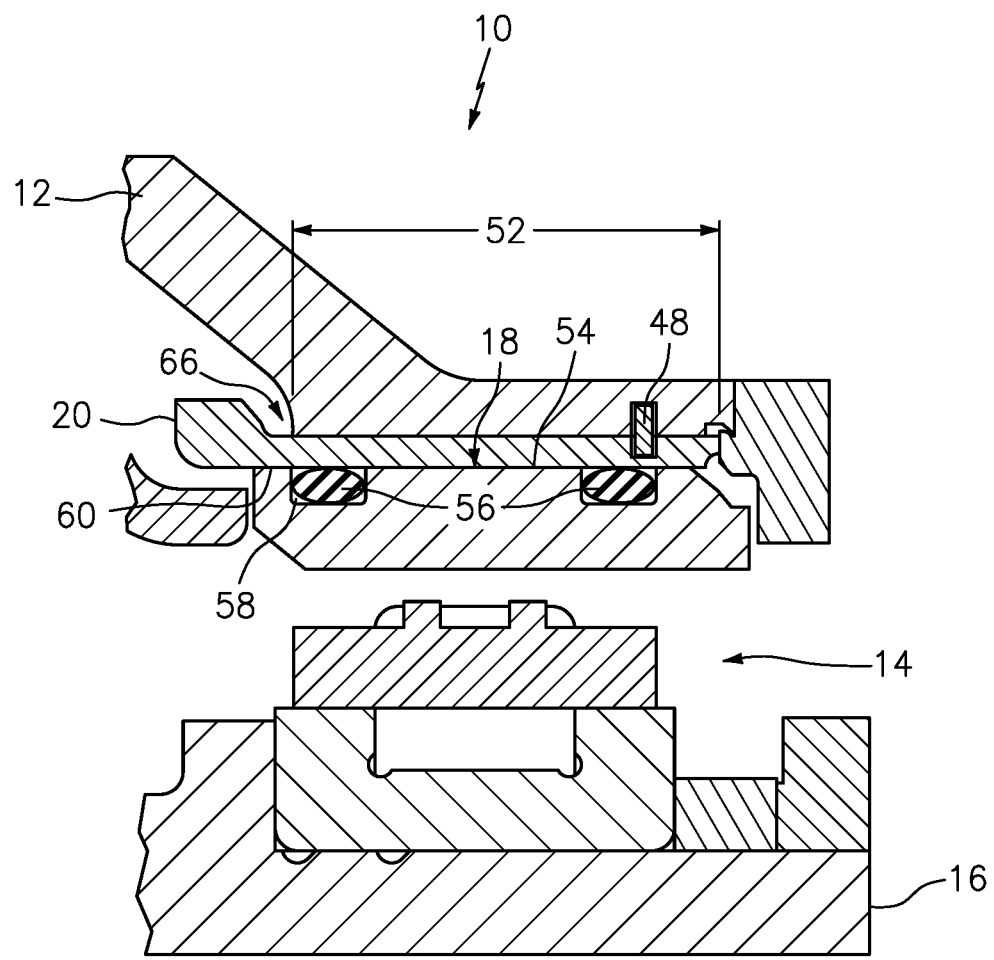
FIG. 1 is a cross-sectional schematic diagram of a bearing and housing with an exemplary bearing sleeve.

Referring now to FIG. 1, there is illustrated an exemplary turbine engine bearing assembly 10. The turbine engine bearing assembly 10 has a housing 12 with a bearing 14 mounted within the housing 12. The bearing 14 supports the shaft 16 of the turbine engine. An oil damper 18 is situated proximate the bearing 14.

Referring also to FIGS. 1-4, a sleeve 20 is inserted between the bearing 14 and the housing 12. The sleeve 20 includes a cylinder shaped body 22. The body 22 includes a forward end 24 opposite an aft end 26. The body 22 also includes an interior surface 28 opposite an exterior surface 30. The interior surface 28 interfaces with the bearing 14. The exterior surface 30 interfaces with the housing 12.

The body 22 includes a ring portion 32. The ring portion 32 includes a thickened cross section 34 that has a greater thickness than the remainder of the body 22. The thickened cross-section 34 is configured to stiffen the sleeve 20 proximate an extension portion 40. In an exemplary embodiment, the ring portion 32 outer diameter 36 that is greater than an outer diameter 38 of the remainder of the body 22. In an exemplary embodiment, the ring portion outer diameter 36 can be from about 101 percent to about 300 percent of the outer diameter 38. In an exemplary embodiment, the body 22 can have a thickness of from about 0.030 inches to about 0.2 inches. The ring portion 32 includes a geometry that provides added stiffness to the body 22. The added stiffness is advantageous to the sleeve 20, since an extension portion 40 of the body 22 extends beyond the confines of the housing 12, and is thus unsupported. The ring portion 32 enables a sleeve 20 inner diameter 42 to be maintained for use with the bearing 14, while the added mechanical properties, such as stiffness, can be maintained to prevent thermal or mechanical distortion of the sleeve 20.

A seal receiver 44 can be formed in the body 22. The seal receiver 44 can include a chamfer 46 section at the forward end 24 formed into the interior surface 28 proximate the ring portion 32. The seal receiver 44 can be configured to receive a seal, such as an O-ring 56. The seal receiver 44 can be a tapered cut back of the interior surface 28 that increases the inner diameter 42 of the body 22. The chamfer 46 can include a minimum radius of about 0.010 inches at the intersection with the inner diameter 42. The angle formed by the chamfer 46 relative to the interior surface 28 can be from about 10 degrees to about 30 degrees. In an exemplary embodiment, the receiver 44 can have an outermost diameter greater than an outer diameter of the O-ring 56 installed in the damper seal grooves 58.

A feature 48 can be formed in the body 22, at the aft end 26 and/or between the forward end 24 and aft end 26 and/or along the exterior surface 30. The feature 48 can be an anti-rotation feature, clocking feature and the like. The anti-rotation feature prevents the unwanted rotation of the sleeve 20 relative to the other components, such as the housing 12. In an exemplary embodiment, the feature 48 can include a retention pin that is inserted into corresponding bores in the body 22 and housing 12.

The sleeve 20 can include a length 50 from between the forward end 24 and aft end 26. The length 50 can be a dimension that is larger than the length 52 of a bore 66 of the housing 12 proximate to the sleeve 20. The length 50 of the sleeve 20 enables the existing housing 12 to be utilized and accommodate new functional requirements, such as the oil damper 18 or a longer active damper surface 54 as well as the seal receiver 44 configured to accept the O-rings 56 as required for the oil damper 18. The longer active damper surface 54 between the O-rings 56 enables an extended interface length. In an exemplary embodiment, the active damper surface 54 can support a damper film length from about 5 percent to about 15 percent of an outer diameter of the damper 18. The oil damper 18 can include damper seal grooves 58 that retain the O-rings 56 or piston rings (not shown). In an exemplary embodiment, the damper seal grooves 58 can be from about 0.090 inches to about 0.210 inches. Damper stop surfaces 60 bound the damper seal grooves 58 and extend outside the damper seal grooves 58. In an exemplary embodiment, the damper stop surfaces can have a length from about 1 percent to about 3 percent of the diameter at these locations.

Figure 2:
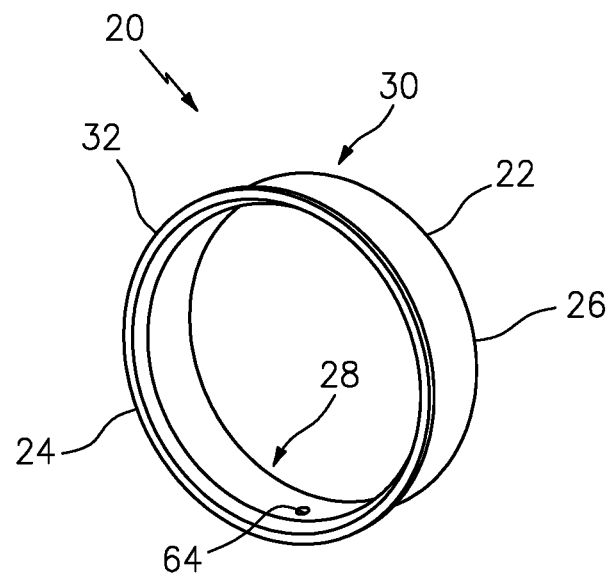
FIG. 2 is an isometric diagram of an exemplary bearing sleeve.
Figure 3:
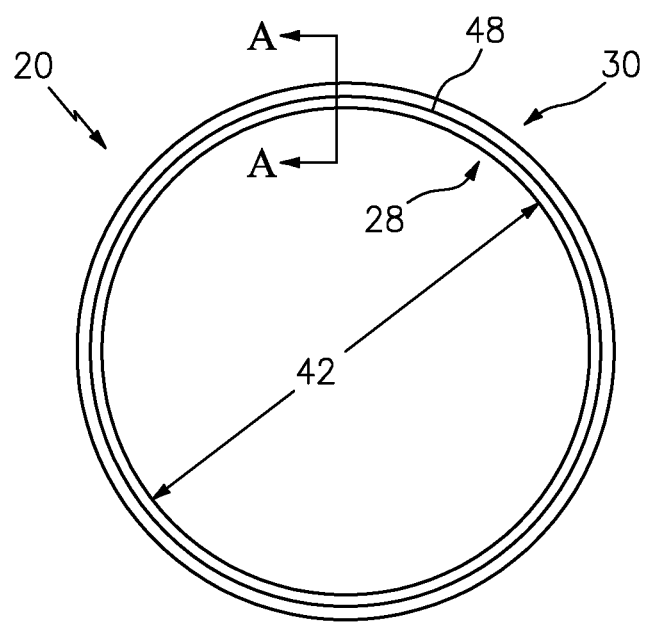
FIG. 3 is a forward view of the exemplary bearing sleeve.
Figure 4:
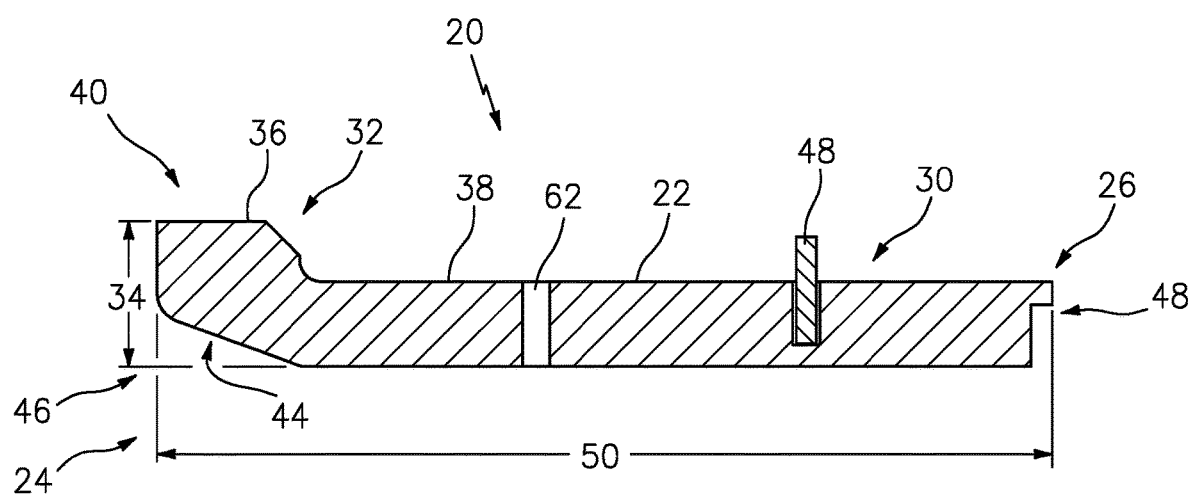
FIG. 4 is a cross-sectional schematic diagram through A-A of the exemplary bearing sleeve in FIG. 3.

In an exemplary embodiment, as seen at FIG. 2 and FIG. 4, the body 22 can include a damper oil feed hole/bore 62 and/or a damper oil drain/egress hole/bore 64. The damper oil bores 62, 64 allow for the proper damper oil flow.

A technical advantage of the disclosed sleeve includes the alternative means of extending an interface surface in order to fulfill a necessary new function that could not be supported by existing hardware.

Another technical advantage of the disclosed sleeve includes re-use of components for progressive development testing.

Another technical advantage of the disclosed sleeve includes the potential use in new applications where design constraints limit an existing surface interface.

Another technical advantage of the disclosed sleeve includes the ability to utilize the already manufactured housing in a forward bearing compartment of an old demonstrator engine.

Another technical advantage of the disclosed sleeve includes a capacity to extend the active damper surface beyond the housing and damper interface.

Another technical advantage of the disclosed sleeve incorporates a feature to extend the interface surface to enable new functionality.

There has been provided a bearing damper sleeve. While the sleeve has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A gas turbine bearing assembly comprising:
   a housing bore proximate a bearing having an oil damper including a damper stop surface that extends beyond the support of said housing bore, said bearing supporting a shaft;
   a sleeve having a cylinder shaped body having a forward end opposite an aft end, said body including an interior surface opposite an exterior surface, said body configured insertable between said bearing proximate said interior surface and said housing bore proximate said exterior surface; said sleeve including a ring portion proximate said forward end, said ring portion having an outer diameter larger than a diameter of said body, wherein said ring portion comprises a thickened cross-section that has a greater thickness than the remainder of the cylinder shaped body of the ring portion configured to stiffen said sleeve proximate said extension portion; and an extension portion configured to support a damper stop surface extending beyond and being unsupported by said housing bore proximate to the sleeve; said extension portion configured to support the damper stop surface that extends beyond said housing bore, and an active damper surface configured to support a damper film length from 5 percent to 15 percent of an outer diameter of the bearing damper.

2. The gas turbine bearing assembly according to claim 1, wherein said extension portion provides a sleeve length longer than the housing bore length.

3. The gas turbine bearing assembly according to claim 1, further comprising:
   a seal receiver formed in said interior surface proximate said ring portion at said forward end.

4. The gas turbine bearing assembly according to claim 3, wherein said seal receiver is configured as a chamfer.

5. The gas turbine bearing assembly according to claim 1, wherein said ring portion includes a geometry that provides added stiffness to the body, said added stiffness including mechanical properties, configured to prevent thermal or mechanical distortion of the sleeve.

6. A process for creating an active damper surface extending beyond a housing bore comprising:
   inserting a sleeve between the housing and a bearing mounted within said housing bore, said bearing including a damper stop surface that extends beyond the support of said housing bore and is unsupported by the housing bore;
   said sleeve having a cylinder shaped body having a forward end opposite an aft end, said body including an interior surface opposite an exterior surface, said body configured insertable between said bearing proximate said interior surface and said housing bore proximate said exterior surface; said sleeve including a ring portion proximate said forward end, said ring portion having an outer diameter larger than a diameter of said body; and
   an extension portion configured to support a damper stop surface extending beyond said housing bore proximate to the sleeve; said extension portion configured to support the damper stop surface that extends beyond said housing bore, and an active damper surface configured to support a damper film length from 5 percent to 15 percent of an outer diameter of the bearing damper.

7. The process of claim 6, wherein said extension portion provides a sleeve length longer than the housing bore length.

8. The process of claim 6, wherein said sleeve comprises said active damper surface between O-rings, said active damper surface enables an extended interface length of a damper coupled to said bearing proximate said housing bore.

9. The process of claim 6, wherein said ring portion includes cross section that has a greater thickness than the remainder of the body.

10. The process of claim 6, further comprising:
    a seal receiver formed in said interior surface proximate said ring portion at said forward end.

11. The process of claim 6, wherein said ring portion includes a geometry that provides added stiffness to the body, said added stiffness including mechanical properties, configured to prevent thermal or mechanical distortion of the sleeve.

12. The process of claim 11, further comprising:
    a feature formed in said body between the forward end and the aft end, said feature comprising at least one of an anti-rotation feature, and a clocking feature.

\* \* \* \* \*